US011140036B2

(12) United States Patent
Klinger et al.

(10) Patent No.: US 11,140,036 B2
(45) Date of Patent: Oct. 5, 2021

(54) IDENTIFYING GROUPS OF RELATED NODES IN AN INTEGRATION FLOW

(71) Applicant: INTERNATIONAL BUSINESS MACHINES CORPORATION, Armonk, NY (US)

(72) Inventors: Doina L. Klinger, Winchester (GB); John A. Reeve, Winchester (GB); Ashley Harrison, Southampton (GB); Vlad Balanescu, Stanmore (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 16/249,412

(22) Filed: Jan. 16, 2019

(65) Prior Publication Data

US 2020/0228403 A1    Jul. 16, 2020

(51) Int. Cl.
*H04L 12/24* (2006.01)
*G06F 9/455* (2018.01)

(52) U.S. Cl.
CPC ...... *H04L 41/0893* (2013.01); *G06F 9/45558* (2013.01); *H04L 41/12* (2013.01)

(58) Field of Classification Search
CPC .............................. G06F 9/45558; H04L 41/12
See application file for complete search history.

(56) References Cited

U.S. PATENT DOCUMENTS 7,665,028 B2   2/2010   Cummins et al.
8,631,388 B2   1/2014   Huang et al.
(Continued)

FOREIGN PATENT DOCUMENTS

| CN | 104541247 | 4/2015 |
| JP | 2008059164 | 3/2008 |
| JP | 4635987 | 2/2011 |

OTHER PUBLICATIONS

Feoktistov et al., "Development of distributed subject-oriented applications for cloud computing through the integration of conceptual and modular programming", IEEE, Jul. 2, 2018, abstract, 3 pages.

*Primary Examiner* — Christopher B Robinson
(74) *Attorney, Agent, or Firm* — Christopher Pignato; Andrew D. Wright; Roberts Calderon Safran & Cole, P.C.

(57) ABSTRACT

Methods and systems for identifying groups of related nodes in an integration flow are disclosed. A method includes: receiving, by a computing device, an integration flow document including information indicative of: (i) a plurality of nodes, with each node representing a processing step in an integration flow, (ii) a plurality of input parameters, and (iii) a plurality of input sources; determining, by the computing device, a plurality of mappings, with each mapping representing an association between an input parameter and an input source; determining, by the computing device, a plurality of grouped nodes of the plurality of nodes based upon the plurality of mappings; receiving, by the computing device, a request to perform a first operation on a first target node of the plurality of nodes; determining, by the computing device, that the first target node is included in the plurality of grouped nodes; and in response to determining that the first target node is included in the plurality of grouped nodes, performing, by the computing device, the first operation on each grouped node of the plurality of grouped nodes.

20 Claims, 7 Drawing Sheets

(56) References Cited

U.S. PATENT DOCUMENTS

| | | | | |
|---|---|---|---|---|
| 9,779,063 | B1* | 10/2017 | Dykema | G06F 16/5854 |
| 2005/0091251 | A1* | 4/2005 | Ramarao | G06F 21/552 |
| 2009/0132958 | A1 | 5/2009 | Greer et al. | |
| 2012/0054717 | A1 | 3/2012 | Huang et al. | |
| 2014/0344211 | A1* | 11/2014 | Allan | G06F 8/433 |
| | | | | 707/602 |
| 2016/0034318 | A1* | 2/2016 | Byreddy | G06F 9/5072 |
| | | | | 718/105 |
| 2018/0081643 | A1* | 3/2018 | Gravenites | G06F 8/34 |
| 2018/0081739 | A1* | 3/2018 | Gravenites | H04L 41/0856 |
| 2019/0102408 | A1* | 4/2019 | Loaiza | G06F 16/2282 |

\* cited by examiner

IDENTIFYING GROUPS OF RELATED NODES IN AN INTEGRATION FLOW

BACKGROUND

The present invention generally relates to computing devices and, more particularly, to methods and systems for identifying groups of related nodes in an integration flow.

Integration flows connect applications and data across a plurality of environments. As the term is used herein, an "environment" means a set of physical and/or virtual computing devices where an application is run. The environment may be defined in part upon what code is being run by the physical and/or virtual computing devices (for example, which operating system(s) are running, what middleware is present, what other applications are running, etc.). Some non-limiting examples of environments are: (i) a set of physical computing devices located on-premises of an enterprise that are running version 5 or 6 of a given POSIX operating system; (ii) a set of physical computing devices dispersed over a wide geographic area and running a specialized middleware platform on top of a Windows operating system; (iii) a private cloud running numerous Java virtual machines; and (iv) a public cloud running numerous Docker containers.

Integration flows recognize events in source applications and trigger business actions in response to the events. As the term is used herein, an "integration flow" describes the flow of data from one application to another, often in a series (although flows of data among and between various application involved in a given integration flow may be more complex). In a simple series integration flow, output from one application becomes input data for the next application in a series. As a simple example of an integration flow, consider an integration flow where: (i) a document is first created using a word processing application and is output as output data of the word processing application in a word processing format (such as *.rtf); (ii) the data output by the word processing program is received as input data by a Portable Document Format (*.pdf) conversion application, converted to *.pdf format and output as output data; and (iii) the data output by the PDF conversion application is received as input data by a database management program and stored in a large database in *.pdf format at an appropriate physical and logical location, as determined by the database management program. An integration flow document is a document that describes an integration flow (like the preceding sentence). However, unlike the preceding sentence, integration flow documents are typically stored in a format such as xml, json, or yaml and are typically interpreted by a particular runtime as a set of instructions for interacting with other systems.

Typically, an integration flow is defined by configuring nodes that represent interactions with external connectors as well as by configuring control logic. As the term is used herein, a "node" describes a processing step in an integration flow document. A node is typically executed by the runtime that is executing the integration flow document. An application node is a type of node that represents an interaction with an external system, such as a database. In an example, an application node for a database may include a database name, an account to be used to connect to the database, and a database table to be updated. A control node is another type of node that describes non-linear execution paths such as decision points. In an example, an "if" node is a control node, and depending on a particular condition (e.g., an address is a U.S. address or a non-U.S. address), a different database table is updated.

In an integration flow, an application node is typically configured to perform its action by using, as input parameters, the output of one or more nodes executed before the application node in a given execution branch or recursively, before the application node's container in its execution branch. Related nodes and interactions are typically linked to each other, one after the other, in an integration flow.

SUMMARY

In a first aspect of the invention, there is a method that includes: receiving, by a computing device, an integration flow document including information indicative of: (i) a plurality of nodes, with each node representing a processing step in an integration flow, (ii) a plurality of input parameters, and (iii) a plurality of input sources; determining, by the computing device, a plurality of mappings, with each mapping representing an association between an input parameter and an input source; determining, by the computing device, a plurality of grouped nodes of the plurality of nodes based upon the plurality of mappings; receiving, by the computing device, a request to perform a first operation on a first target node of the plurality of nodes; determining, by the computing device, that the first target node is included in the plurality of grouped nodes; and in response to determining that the first target node is included in the plurality of grouped nodes, performing, by the computing device, the first operation on each grouped node of the plurality of grouped nodes.

In another aspect of the invention, there is a computer program product that includes a computer readable storage medium having program instructions embodied therewith. The program instructions are executable by a computing device to cause the computing device to: receive an integration flow document including information indicative of: (i) a plurality of nodes, with each node representing a processing step in an integration flow, (ii) a plurality of input parameters, and (iii) a plurality of input sources; determine a plurality of mappings, with each mapping representing an association between an input parameter and an input source; determine a plurality of grouped nodes of the plurality of nodes based upon the plurality of mappings; receive a request to perform a first operation on a first target node of the plurality of nodes; determine that the first target node is included in the plurality of grouped nodes; and in response to determining that the first target node is included in the plurality of grouped nodes, perform the first operation on each grouped node of the plurality of grouped nodes.

In another aspect of the invention, there is a system that includes: a hardware processor, a computer readable memory, and a computer readable storage medium associated with a computing device; program instructions to receive an integration flow document including information indicative of: (i) a plurality of nodes, with each node representing a processing step in an integration flow, (ii) a plurality of input parameters, and (iii) a plurality of input sources; program instructions to determine a plurality of mappings, with each mapping representing an association between an input parameter and an input source; program instructions to determine a plurality of grouped nodes of the plurality of nodes based upon the plurality of mappings; program instructions to receive a request to perform a first operation on a first target node of the plurality of nodes; program instructions to determine that the first target node is included in the plurality of grouped nodes; and program instructions to, in response to determining that the first target node is included in the plurality of grouped nodes, perform the first operation on each grouped node of the plurality of grouped nodes, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
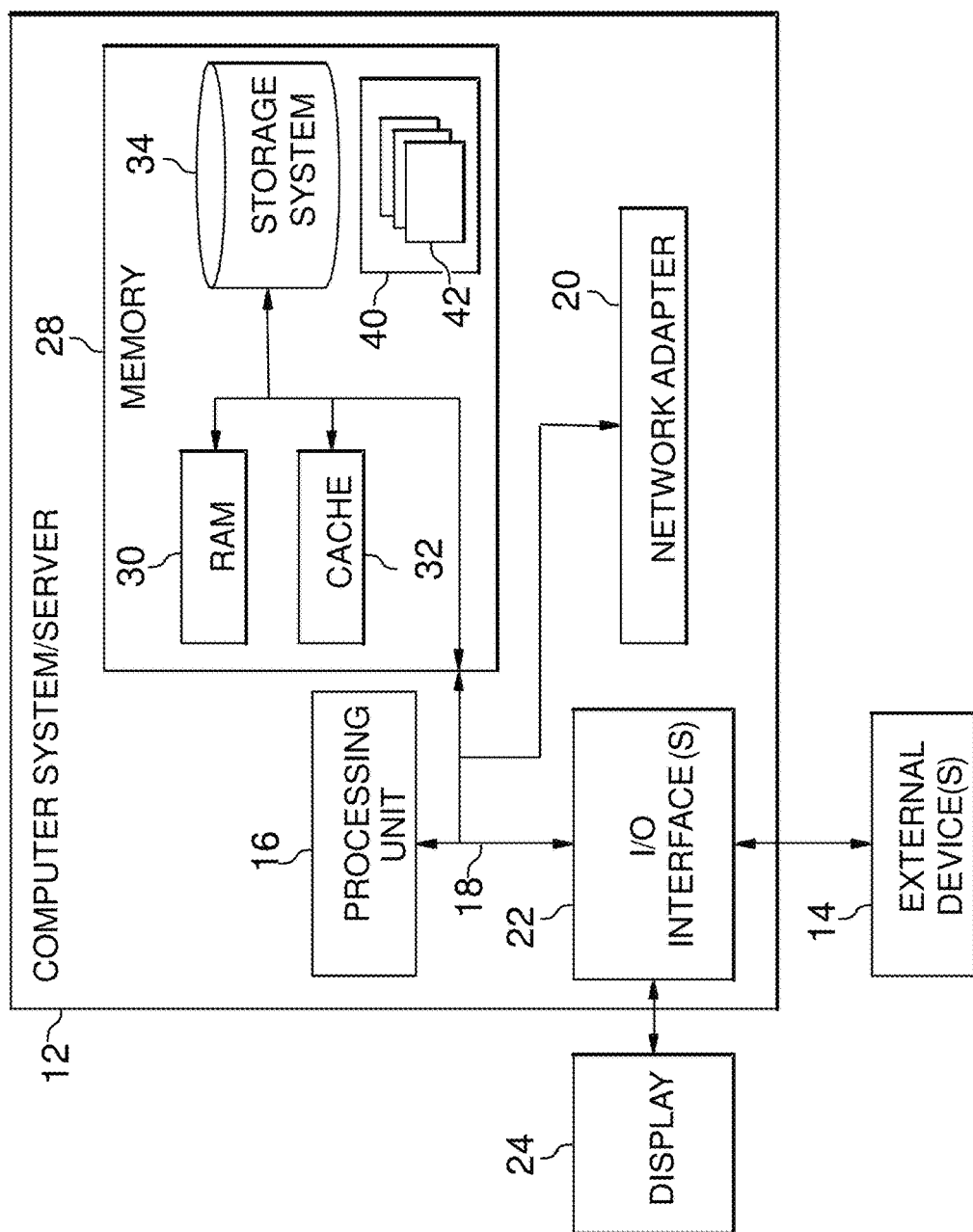
FIG. 1 depicts a computer system in accordance with aspects of the invention.

The present invention generally relates to computing devices and, more particularly, to methods and systems for identifying groups of related nodes in an integration flow. As described herein, aspects of the invention include a method and system for analyzing node mappings of a node and determining whether or not the node is part of a group. Additionally, aspects of the invention include methods and systems for performing move, delete, and copy operations on nodes that are part of a group.

In embodiments, editor operations (e.g., drag and drop, delete, and copy and paste) that target a single node that is part of a group are applied to all nodes within the group. In embodiments, each node has a unique identifier, and each node stores the unique identifiers of other nodes whose output data is used or accessed in the node (e.g., as input data). In embodiments, issues are detected that arise from reordering or deletion of nodes that are part of a group. Additionally, issues are detected that arise due to a change in an output schema of a node that is part of a group.

In embodiments, when nodes are reordered or deleted, each node is validated to determine if the reordering or deletion impacts one or more nodes in a group that use output data from other nodes in the group. If the reordering or deletion causes the validation to fail (e.g., one or more nodes uses output data from a node that no longer precedes the node in the integration flow), then one or more actions is taken to mitigate the failure (e.g., reverting the change that caused the error, allowing the change to be made but flagging the problematic node as needed fixing, or automatically removing any invalid references to schemas that no longer exist).

Certain nodes in an integration flow may be tightly related and are therefore considered to be members of a group. In embodiments, a method and system are provided that identify groups of nodes in an integration flow and provide information to users and take corrective actions when actions are performed in an editor that affect nodes in the groups.

In an example, a second node in an integration flow uses a sales lead output by a first node in the integration flow to add or update data in a database. The integration flow in the example may also contain other logic that comes from the same trigger (i.e., the sales lead output by the first node), for example, updates to other systems, and generation of emails or messages. However, the first node and the second node are considered to be a group or unit because the second node only depends on the sales lead output by the first node. In the example, if a user revises the integration flow at a later stage by performing an editor operation (e.g., moving, copying, or deleting a node), embodiments notify the user regarding the impact of the editor operation on the group and provide options to perform the operation in a way that maintains the integrity of the group (e.g., by moving, copying, or deleting all of the nodes in the group).

Accordingly, embodiments improve the functioning of a computer by providing methods and systems for identifying groups of related nodes in an integration flow. In particular, embodiments improve software by analyzing node mappings of a node and determining whether or not the node is part of a group. Additionally, embodiments improve software by performing move, delete, and copy operations on nodes that are part of a group in a way that maintains the integrity of the group. Additionally, implementations of the invention use techniques that are, by definition, rooted in computer technology (e.g., integration flows and node mappings).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
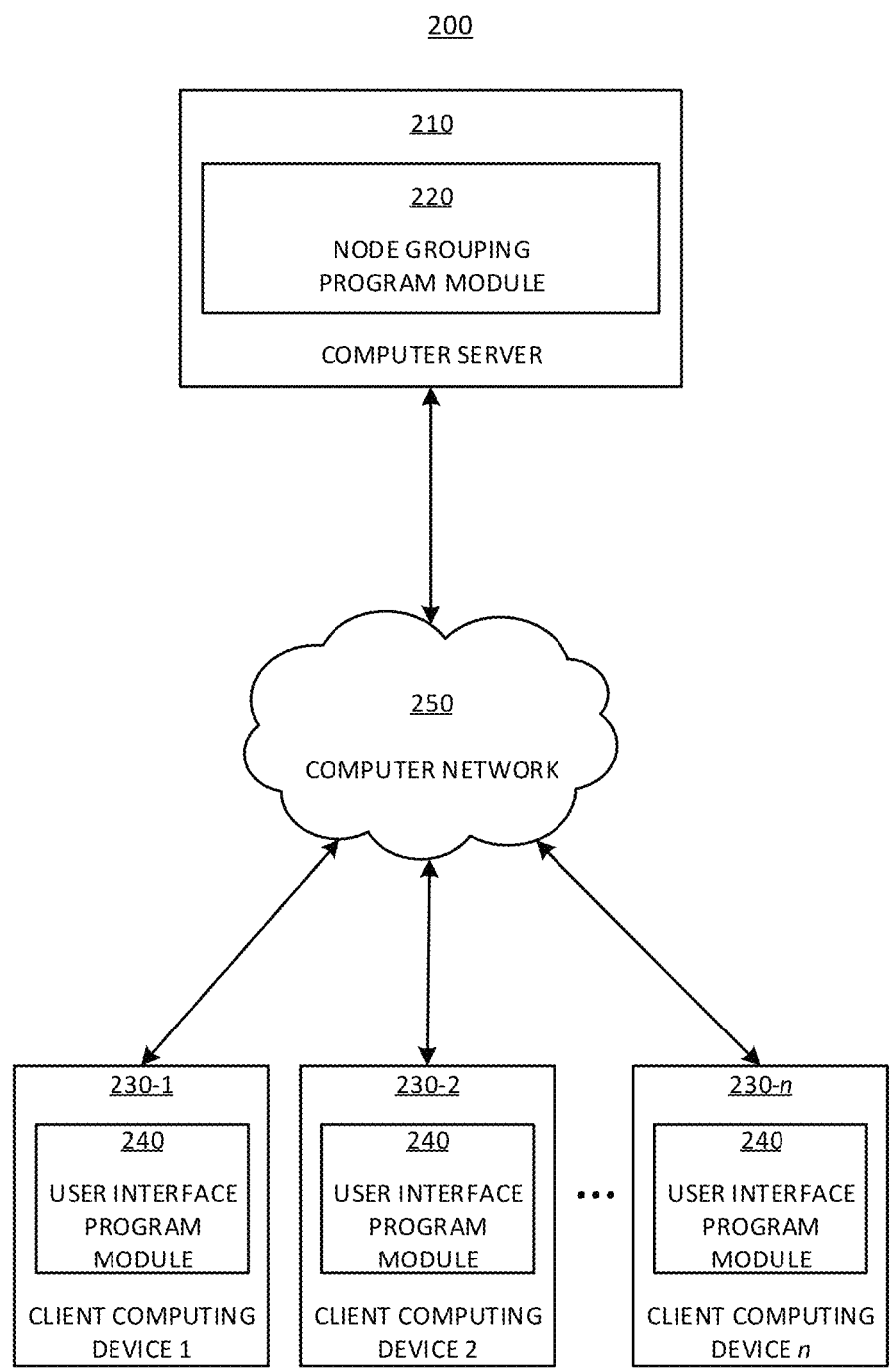
FIG. 2 depicts an illustrative environment in accordance with aspects of the invention.

FIG. 2 depicts an illustrative environment 200 in accordance with aspects of the invention. As shown, the environment 200 comprises a computer server 210 and a plurality of client computing devices 230-1, 230-2, . . . , 230-n which are in communication via a computer network 250. In embodiments, the computer network 250 is any suitable network including any combination of a LAN, WAN, or the Internet.

In embodiments, the computer server 210 and the client computing devices 230-1, 230-2, . . . , 230-n are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a node grouping program module 220, which includes hardware and/or software such as one or more of the program modules 42 shown in FIG. 1. The node grouping program module 220 includes program instructions for identifying groups of related nodes in an integration flow and for performing move, delete, and copy operations on nodes that are part of a group. In embodiments, the program instructions included in the node grouping program module 220 of the computer server 210 are executed by one or more hardware processors.

Still referring to FIG. 2, in embodiments, each of the client computing devices 230-1, 230-2, . . . , 230-n is a computer device comprising one or more elements of the computer system/server 12 (as shown in FIG. 1). In embodiments, each of the client computing devices 230-1, 230-2, . . . , 230-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. In other embodiments, each of the client computing devices 230-1, 230-2, . . . , 230-n is a desktop computer, a laptop computer, a mobile device such as a cellular phone, tablet, personal digital assistant (PDA), or other computing device.

In embodiments, each of the client computing devices 230-1, 230-2, . . . , 230-n includes a user interface program module 240, which includes hardware and/or software such as one or more of the program modules 42 shown in FIG. 1. The user interface program module 240 includes program instructions for a user interface of an editor application that is usable to create and edit integration flows. In embodiments, the program instructions included in the user interface program module 240 of each of the client computing devices 230-1, 230-2, . . . , 230-n are executed by one or more hardware processors. In embodiments, the computer server 210, including the node grouping program module 220, provides certain functionalities to the editor application, as described below with respect to FIGS. 3, 4, 5, and 6.

Figure 3:
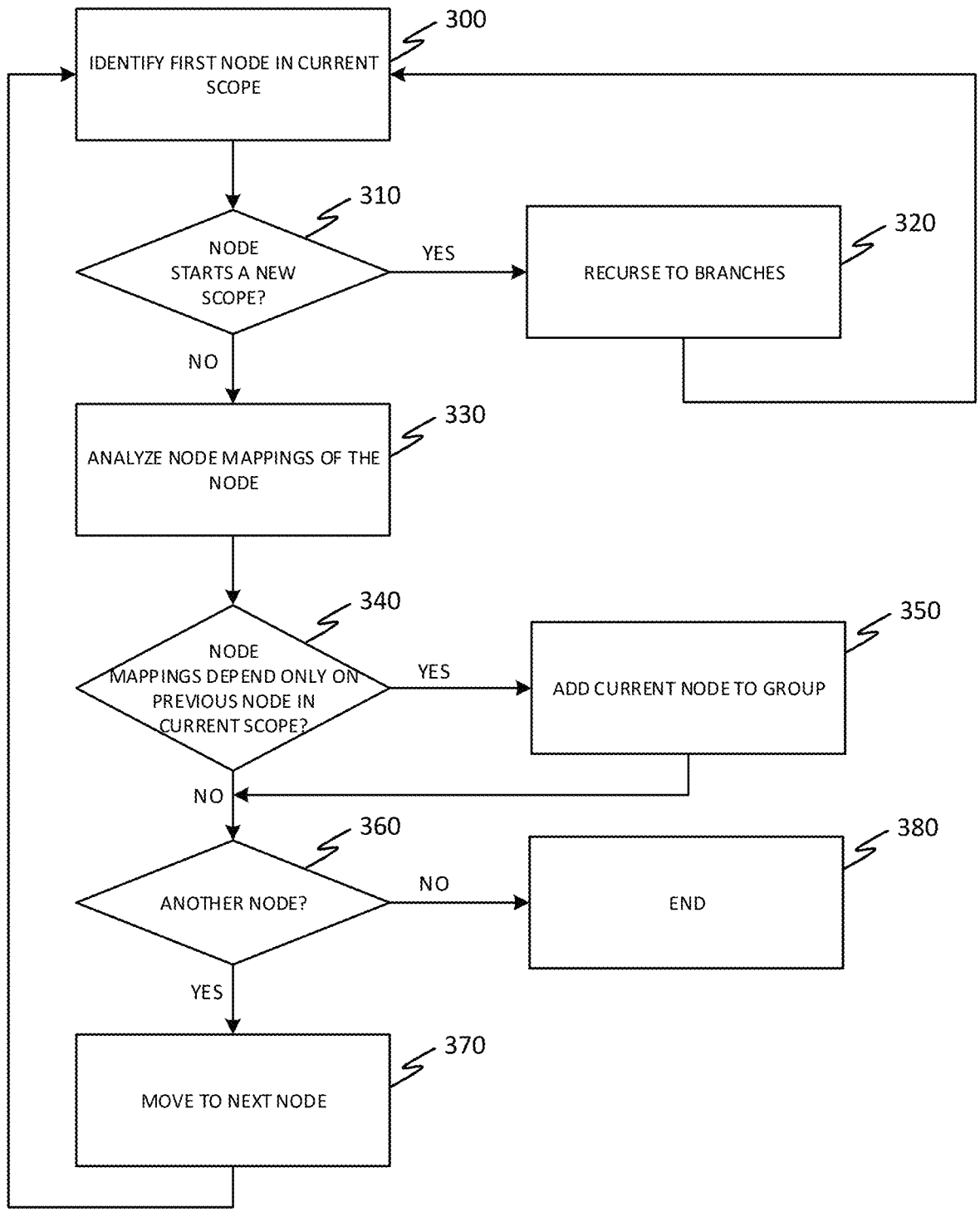
FIGS. 3, 4, 5, and 6 depict flowcharts of exemplary methods performed in accordance with aspects of the invention.

FIG. 3 depicts a flowchart of an exemplary method performed by the node grouping program module 220 of the computer server 210 to identify groups of nodes in accordance with aspects of the invention. The steps of the method depicted in FIG. 3 may be performed in response to a node being added to or deleted from an integration flow by a user via the user interface program module 240 running on one of the client computing devices 230-1, 230-2, . . . , 230-*n*. The steps of the method are performed in the environment of FIG. 2 and are described with reference to the elements shown in FIG. 2.

At step 300, the computer server 210 identifies a first node in a current scope (e.g., in response to a node being added to or deleted from an integration flow via the user interface program module 240). In embodiments, the node grouping program module 220 starts by identifying the first node in the current scope in an integration flow. At a top-level scope in the integration flow, the first node is a trigger node (e.g., a node that starts the integration flow when a condition is present) or a request node (e.g., a node that starts the integration flow in response to receiving a request).

In particular, in embodiments, at step 300, the node grouping program module 220 receives an integration flow document including information indicative of a plurality of nodes, with each node representing a processing step in an integration flow; a plurality of input parameters; and a plurality of input sources. The node grouping program module 220 identifies the first node in the current scope in the integration flow in the integration flow document.

At step 310, the computer server 210 determines whether or not the node starts a new scope (e.g., branch). In embodiments, the node grouping program module 220 determines whether or not the node is an "if" node, a "forEach" node, or another node that starts a new scope in the integration flow in the integration flow document. If the node grouping program module 220 determines that the node starts a new scope in the integration flow in the integration flow document, then the flow proceeds to step 320. On the other hand, if the node grouping program module 220 determines that the node does not start a new scope in the integration flow in the integration flow document, then the flow proceeds to step 330.

At step 320, the computer server 210 recurses to the branches. In embodiments, the node grouping program module 220 causes the method of FIG. 3, starting with step 300, to be performed recursively on the first node in each branch. For example, in the case of an "if" node, the node grouping program module 220 causes the method of FIG. 3, starting with step 300, to be performed on both the first node in the "if" branch and the first node in the "else" branch.

At step 330, the computer server 210 analyzes node mappings of the node. In embodiments, the node grouping program module 220 analyzes the node to identify any other nodes (or the output therefrom) in the integration flow upon which the node depends for its input parameters. In particular, the node grouping program module 220 retrieves node mappings stored in the node that define the source(s) (e.g., a trigger node and/or other previous nodes) of input parameters to the node as well as how the input parameters are used by the node. In other embodiments, the node grouping program module 220 determines the node mappings based on the integration flow and updates the node to include information identifying the other nodes upon which the node depends for its input parameters. Additionally, in embodiments, the node grouping program module 220 ignores mappings that use fields from the trigger or request node.

In an example, for an application node that represents an interaction with a database, the mappings include a set of input parameters (e.g., customer name, customer address, etc.), a source for each of the input parameters (e.g., a trigger node and/or other previous nodes), and a set of columns in a database table into which the input parameters are to be inserted. In the example, for the customer name input parameter, the source is a sender name from an email message that was a trigger for the application node, and the Name column in the Customer database is the column into which the parameter is to be inserted.

At step 340, the computer server 210 determines whether or not the node mappings depend only on the previous node in the current scope. In embodiments, the node grouping program module 220 uses the node mapping analysis from step 330, including the information identifying the other nodes upon which the node depends for its input parameters, to determine whether or not the node depends only on the output of the previous node in the current scope for its input parameters. If the node grouping program module 220 determines that the node depends only on the output of the previous node in the current scope for its input parameters, then the flow proceeds to step 350. On the other hand, if the node grouping program module 220 determines that the node does not depend only on the output of the previous node in the current scope for its input parameters, then the flow proceeds to step 360.

At step 350, the computer server 210 adds the current node to a group. In embodiments, the node grouping program module 220 adds the current node to a group with the previous node (the output of which the current node depends on for its input parameters). If the previous node is itself in a group, then the node grouping program module 220 adds the current node to the group with the previous node.

In embodiments, the node grouping program module 220 stores information about the group (including information identifying the group and the members thereof) in each of the nodes in the group (e.g., in the persisted definition of each node). In other embodiments, the node grouping program module 220 stores information about the group (including information identifying the group and the members thereof) in the computer server 210.

At step 360, the computer server 210 determines whether or not there is another node. In embodiments, the node grouping program module 220 determines whether or not there is another node in the integration flow in the integration flow document in the current scope. If the node grouping program module 220 determines that there is another node in the integration flow in the integration flow document in the current scope, then the flow proceeds to step 370. On the other hand, if the node grouping program module 220 determines that there is not another node in the integration flow in the integration flow document in the current scope, then the flow ends at step 380.

At step 370, the computer server 210 moves to the next node. In embodiments, the node grouping program module 220 identifies the next node in the integration flow in the integration flow document in the current scope. The flow then returns to step 310.

At the conclusion of the method of FIG. 3, the node grouping program module 220 will have identified zero or more groups of nodes in the integration flow. Each group identified by the node grouping program module 220 includes two or more tightly coupled nodes in the integration flow. Each of the nodes in each group depends only on its immediate predecessor's output for its input parameters. The first node in each group is referred to as a root node. In embodiments, the output of the nodes in a group is not used by other nodes. In an example integration flow in which mapping dependencies are well spread in the integration flow, there may be zero groups.

Figure 4:
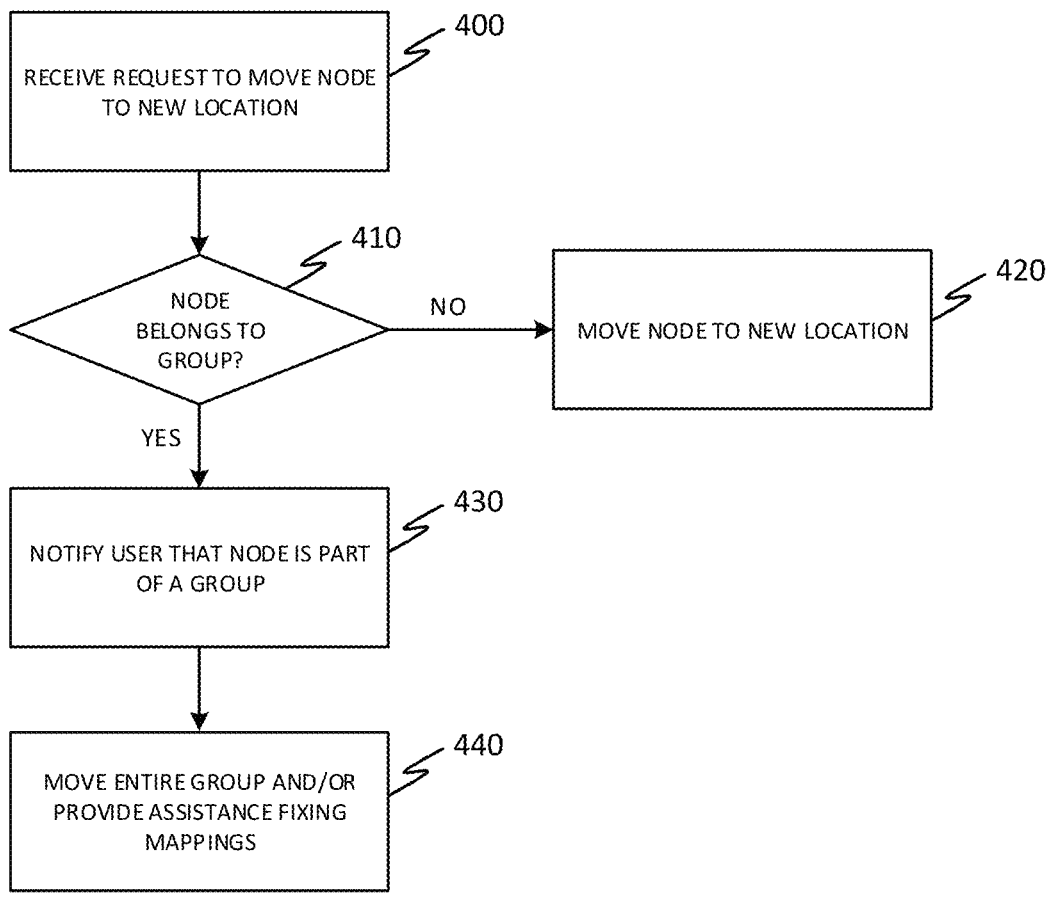

FIG. 4 depicts a flowchart of an exemplary method performed by the node grouping program module 220 of the computer server 210 in response to a request to move a node to a new location in an integration flow made by a user via the user interface program module 240 running on one of the client computing devices 230-1, 230-2, . . . , 230-n. The steps of the method are performed in the environment of FIG. 2 and are described with reference to the elements shown in FIG. 2.

At step 400, the computer server 210 receives a request to move a node to a new location. In embodiments, the node grouping program module 220 receives a request to move a node to a new location in an integration flow from the user via the user interface program module 240 running on one of the client computing devices 230-1, 230-2, . . . , 230-n. In an example, the user may drag the node and drop it in a new location in the integration flow using a user interface provided by the user interface program module 240.

At step 410, the computer server 210 determines whether or not the node belongs to a group. In embodiments, the node grouping program module 220 accesses the node (e.g., the persisted definition of the node) to retrieve information stored therein about any group to which the node may have been determined to belong using the method of FIG. 3. The information retrieved by the node grouping program module 220 from the node includes, for example, information identifying the group and the members thereof. Using this information, the node grouping program module 220 determines whether or not the node belongs to a group.

Still referring to step 410, in other embodiments, the node grouping program module 220 accesses information stored in the computer server 210 to retrieve information about any group to which the node may have been determined to belong using the method of FIG. 3. The information retrieved by the node grouping program module 220 from the computer server 210 includes, for example, information identifying the group and the members thereof. Using this information, the node grouping program module 220 determines whether or not the node belongs to a group.

Still referring to step 410, if the node grouping program module 220 determines that the node does not belong to a group, then the flow proceeds to step 420. On the other hand, if the node grouping program module 220 determines that the nodes does belong to a group, then the flow proceeds to step 430.

At step 420, the computer server 210 moves the node to the new location. In embodiments, the node grouping program module 220 causes the node to be moved to the new location in the integration flow in the user interface provided by the user interface program module 240 running on one of the client computing devices 230-1, 230-2, . . . , 230-n, in accordance with the request received at step 400. The flow then ends.

At step 430, the computer server 210 notifies the user that the node is part of a group. In embodiments, the node grouping program module 220 causes the user interface program module 240 to display a message notifying the user that the node is part of a group. In embodiments, the user interface program module 240 running on one of the client computing devices 230-1, 230-2, . . . , 230-n provides a visual indication of the nodes that are in the group (e.g., by highlighting the nodes in the group or by displaying a box around the nodes in the group).

At step 440, the computer server 210 moves the entire group and/or provides assistance fixing the mappings. In embodiments, the node grouping program module 220 causes the user interface program module 240 to provide the user with the option to either move the entire group of nodes in the integration flow or to move only the single node in the integration flow in accordance with the request received at step 400. In response to feedback received from the user, the node grouping program module 220 then moves either the entire group of nodes in the integration flow or only the single node.

Still referring to step 440, if the user indicates that only the single node is to be moved in the integration flow, then the node grouping program module 220 causes the user interface program module 240 to provide the user with assistance fixing the node mappings. In an example, the user interface program module 240 visually identifies nodes having mappings that are broken as a result of the move (e.g., a node that relies upon the output of another node for its input parameters but the other node no longer precedes the node in the integration flow).

Figure 5:
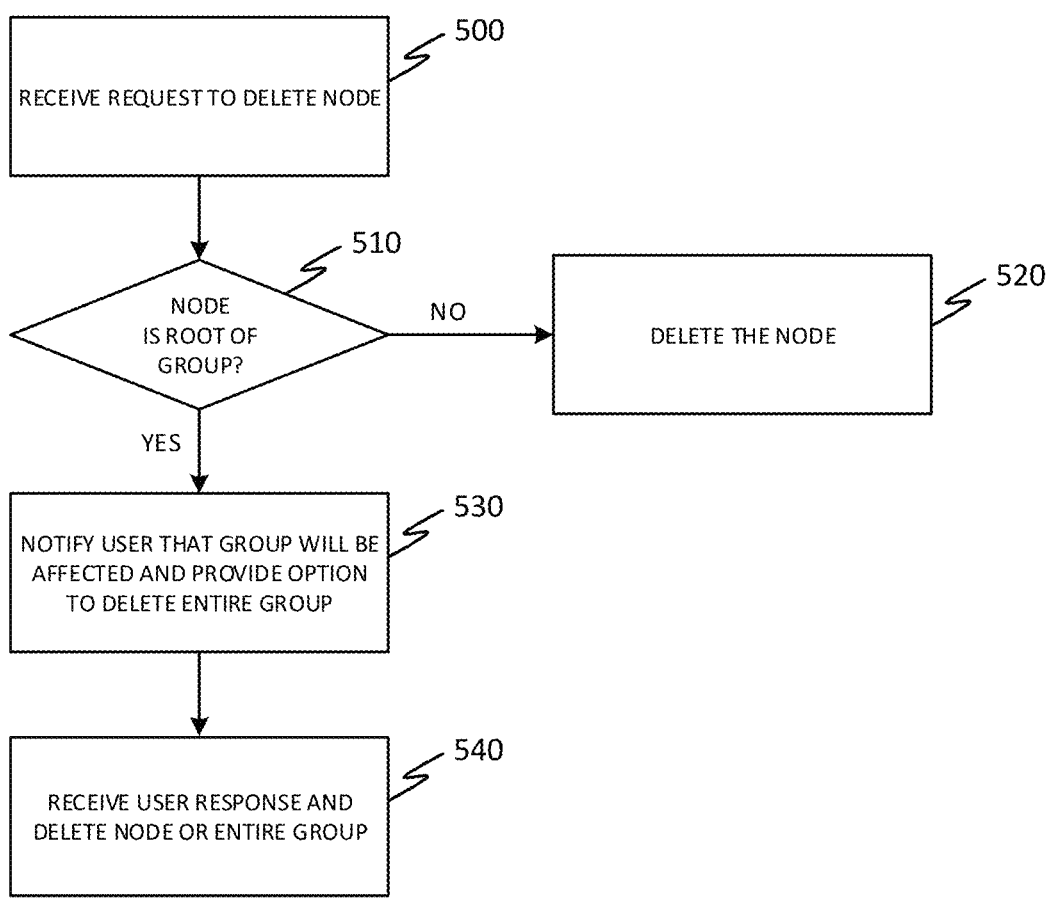

FIG. 5 depicts a flowchart of an exemplary method performed by the node grouping program module 220 of the computer server 210 in response to a request to delete a node in an integration flow made by a user via the user interface program module 240 running on one of the client computing devices 230-1, 230-2, . . . , 230-n. The steps of the method are performed in the environment of FIG. 2 and are described with reference to the elements shown in FIG. 2.

At step 500, the computer server 210 receives a request to delete a node. In embodiments, the node grouping program module 220 receives a request to delete a node in an integration flow from the user via the user interface program module 240 running on one of the client computing devices 230-1, 230-2, . . . , 230-n.

At step 510, the computer server 210 determines whether or not the node is a root node of a group. In embodiments, the node grouping program module 220 accesses the node (e.g., the persisted definition of the node) to retrieve information stored therein about any group to which the node may have been determined to belong using the method of FIG. 3. The information retrieved by the node grouping program module 220 from the node includes, for example, information identifying the group and the members thereof. Using this information, the node grouping program module 220 determines whether or not the node is a root node of a group.

Still referring to step 510, in other embodiments, the node grouping program module 220 accesses information stored in the computer server 210 to retrieve information stored therein about any group to which the node may have been determined to belong using the method of FIG. 3. The information retrieved by the node grouping program module 220 from the computer server 210 includes, for example, information identifying the group and the members thereof. Using this information, the node grouping program module 220 determines whether or not the node is a root node of a group.

Still referring to step 510, if the node grouping program module 220 determines that the node is not a root node of a group, then the flow proceeds to step 520. On the other hand, if the node grouping program module 220 determines that the node is a root node of a group, then the flow proceeds to step 530.

At step 520, the computer server 210 deletes the node. In embodiments, the node grouping program module 220 causes the node to be deleted from the integration flow in the user interface provided by the user interface program module 240 running on one of the client computing devices 230-1, 230-2, . . . , 230-n, in accordance with the request received at step 500. The flow then ends.

At step 530, the computer server 210 notifies the user that the group will be affected and provides the option to delete the entire group. In embodiments, the node grouping program module 220 causes the user interface program module 240 to display a message notifying the user that the node is a root node of a group and deleting the node will affect the group (e.g., break mappings of other nodes in the group that use outputs of the root node for their input parameters) and asking whether or not to delete the entire group. In embodiments, the user interface program module 240 running on one of the client computing devices 230-1, 230-2, . . . , 230-n provides a visual indication of the nodes that are in the group (e.g., by highlighting the nodes in the group or by displaying a box around the nodes in the group).

At step 540, the computer server 210 receives a user response and deletes the node or the entire group. In embodiments, the node grouping program module 220 receives a response from a user via the user interface program module 240 and, based on the received response, either deletes the entire group of nodes in the integration flow or deletes only the single node in the integration flow in accordance with the request received at step 500.

Figure 6:
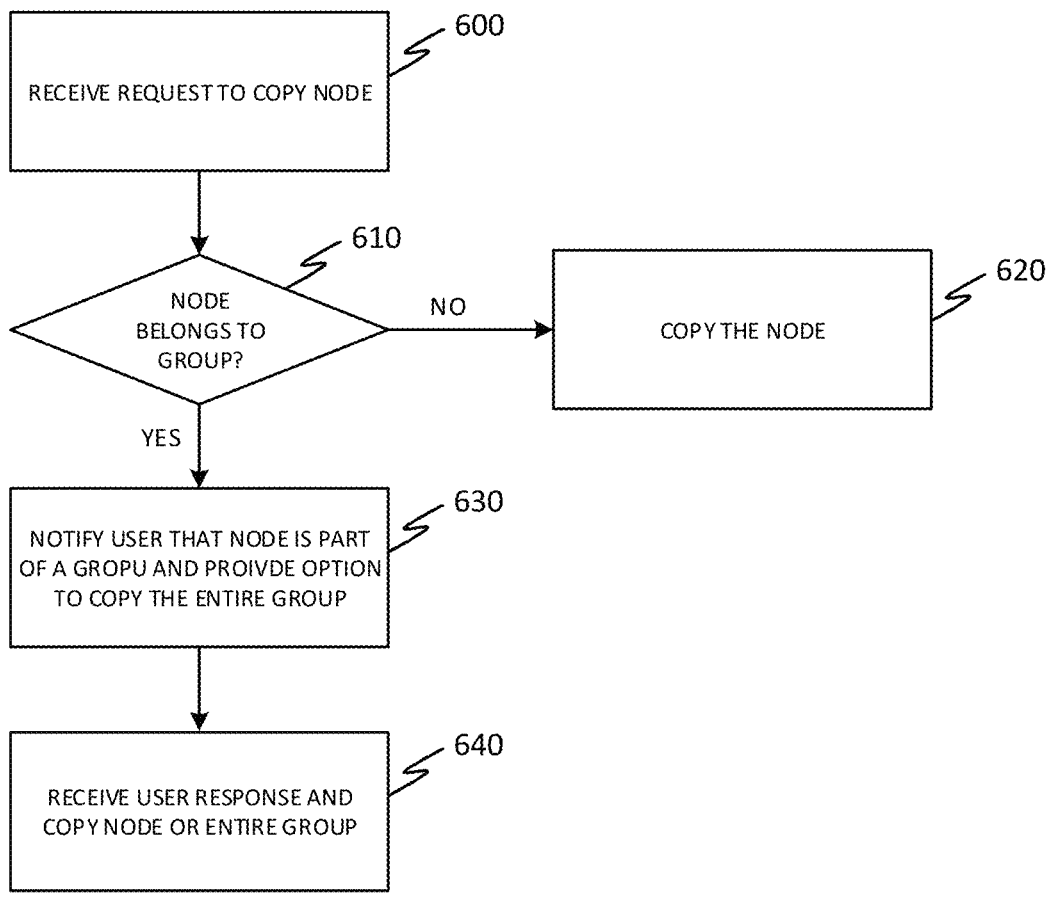

FIG. 6 depicts a flowchart of an exemplary method performed by the node grouping program module 220 of the computer server 210 in response to a request to copy a node in an integration flow made by a user via the user interface program module 240 running on one of the client computing devices 230-1, 230-2, . . . , 230-n. The steps of the method are performed in the environment of FIG. 2 and are described with reference to the elements shown in FIG. 2.

At step 600, the computer server 210 receives a request to copy a node. In embodiments, the node grouping program module 220 receives a request to copy a node in an integration flow, including a node to a copy and a destination location to which the node is to be copied, from the user via the user interface program module 240 running on one of the client computing devices 230-1, 230-2, . . . , 230-n.

At step 610, the computer server 210 determines whether or not the node belongs to a group. In embodiments, the node grouping program module 220 accesses the node (e.g., the persisted definition of the node) to retrieve information stored therein about any group to which the node may have been determined to belong using the method of FIG. 3. The information retrieved by the node grouping program module 220 from the node includes, for example, information identifying the group and the members thereof. Using this information, the node grouping program module 220 determines whether or not the node belongs to a group.

Still referring to step 610, in other embodiments, the node grouping program module 220 accesses information stored in the computer server 210 to retrieve information about any group to which the node may have been determined to belong using the method of FIG. 3. The information retrieved by the node grouping program module 220 from the computer server 210 includes, for example, information identifying the group and the members thereof. Using this information, the node grouping program module 220 determines whether or not the node belongs to a group.

Still referring to step 610, if the node grouping program module 220 determines that the node does not belong to a group, then the flow proceeds to step 620. On the other hand, if the node grouping program module 220 determines that the node belongs to a group, then the flow proceeds to step 630.

At step 620, the computer server 210 copies the node. In embodiments, the node grouping program module 220 causes the node to be copied to the destination location in the integration flow in the user interface provided by the user interface program module 240 running on one of the client computing devices 230-1, 230-2, . . . , 230-n, in accordance with the request received at step 600. The flow then ends.

At step 630, the computer server 210 notifies the user that the node is part of a group and provides the option to copy the entire group. In embodiments, the node grouping program module 220 causes the user interface program module 240 to display a message notifying the user that the node is part of a group and asking whether or not to copy the entire group. In embodiments, the user interface program module 240 running on one of the client computing devices 230-1, 230-2, . . . , 230-n provides a visual indication of the nodes that are in the group (e.g., by highlighting the nodes in the group or by displaying a box around the nodes in the group).

At step 640, the computer server 210 receives a user response and copies the node or the entire group. In embodiments, the node grouping program module 220 receives a response from a user via the user interface program module 240 and, based on the received response, either copies the entire group of nodes in the integration flow or copies only the single node in the integration flow in accordance with the request received at step 600.

Figure 7:
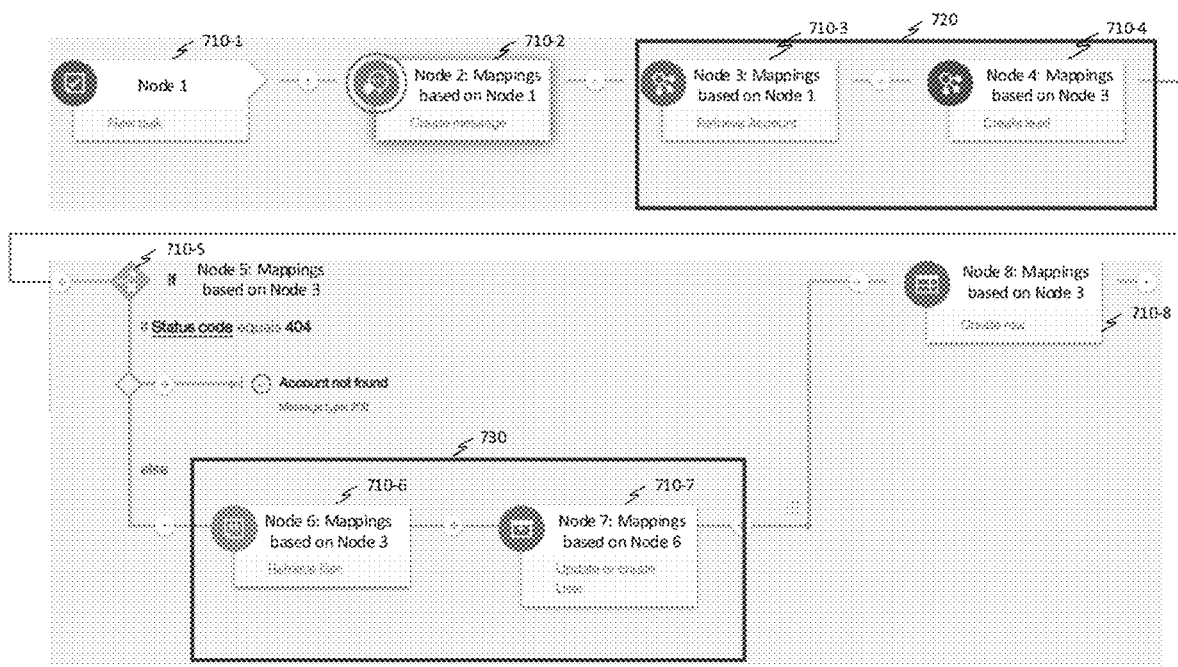
FIG. 7 depicts an exemplary integration flow in accordance with aspects of the invention.

FIG. 7 depicts an exemplary integration flow 700 in accordance with aspects of the invention. As illustrated in FIG. 7, the integration flow 700 includes a plurality of nodes 710-1, 710-2, 710-3, 710-4, 710-5, 710-6, 710-7, 710-8. By performing the method of FIG. 3, the node grouping program module 220 identifies node group 720 and node group 730 in the integration flow 700. In particular, node group 720 includes node 710-3 and node 710-4. Node 710-4 uses the output of node 710-3 as its input, and therefore the unique identifier of node 710-3 is saved to the persisted definition of node 710-4 by the node grouping program module 220. Node group 730 includes node 710-6 and node 710-7. Node 710-7 uses the output of node 710-6 as its input, and therefore the unique identifier of node 710-6 is saved to the persisted definition of node 710-7 by the node grouping program module 220. In the integration flow 700, if node 710-3 is reordered to follow node 710-4, or if node 710-6 is reordered to follow node 710-1, the node grouping program module 220, via the user interface program module 240, provides the user the option to fix the mapping, remove the usage (mapping) in the node causing the error, or revert the change back.

Accordingly, it is understood from the foregoing description that embodiments of the invention provide a method of identifying groups of related nodes within a scope by analyzing their mappings and then using the groups identified to provide better assistance on editor operations.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by a computing device, an integration flow document describing a flow of data, including information indicative of: (i) a plurality of nodes, with each node representing a processing step in an integration flow, (ii) a plurality of input parameters utilized by one of the plurality of nodes, and (iii) a plurality of input sources that are sources of the plurality of input parameters;

determining, by the computing device, a plurality of mappings, with each mapping representing an association between an input parameter utilized by one of the plurality of nodes and another of the plurality of nodes that is an input source of the input parameter;

determining, by the computing device, a plurality of related grouped nodes of the plurality of nodes based upon the plurality of mappings, wherein the plurality of related grouped nodes comprises two or more nodes that each represent a processing step in a series of processing steps, and wherein the two or more nodes each depend only on an immediate predecessor node's output for its input parameters;

receiving, by the computing device, a request to perform a first editing operation on a first target node of the plurality of nodes;

determining, by the computing device, that the first target node is included in the plurality of related grouped nodes; and in response to determining that the first target node is included in the plurality of related grouped nodes, performing, by the computing device, the first editing operation on each grouped node of the plurality of related grouped nodes.

2. The method according to claim 1, further comprising:

receiving, by the computing device, a request to perform a second editing operation on a second target node;

determining, by the computing device, that the second target node is not included in the plurality of related grouped nodes; and in response to determining that the second target node is not included in the plurality of related grouped nodes, performing, by the computing device, the second editing operation only on the second target node.

3. The method according to claim 1, further comprising storing, by the computing device, information identifying the plurality of related grouped nodes in a persisted definition of each grouped node of the plurality of related grouped nodes.

4. The method according to claim 1, further comprising storing, by the computing device, information about other nodes included in the plurality of related grouped nodes in a persisted definition of each grouped node of the plurality of related grouped nodes.

5. The method according to claim 1, wherein the first editing operation is a delete operation.

6. The method according to claim 1, wherein the first editing operation is a copy operation.

7. The method according to claim 1, wherein the first editing operation is a move operation.

8. A computer program product comprising a computer readable storage medium having program instructions embodied therewith, the program instructions executable by a computing device to cause the computing device to:

receive an integration flow document describing a flow of data, including information indicative of: (i) a plurality of nodes, with each node representing a processing step in an integration flow, (ii) a plurality of input parameters utilized by one of the plurality of nodes, and (iii) a plurality of input sources that are sources of the plurality of input parameters;

determine a plurality of mappings, with each mapping representing an association between an input parameter utilized by one of the plurality of nodes and another of the plurality of nodes that is an input source of the input parameter;

determine a plurality of related grouped nodes of the plurality of nodes based upon the plurality of mappings;

receive a request to perform a first editing operation on a first target node of the plurality of nodes;

determine that the first target node is included in the plurality of related grouped nodes; and in response to determining that the first target node is included in the plurality of related grouped nodes, perform the first editing operation on each grouped node of the plurality of related grouped nodes.

9. The computer program product according to claim 8, wherein the plurality of related grouped nodes comprises two or more nodes that each represent a processing step in a series of processing steps, and wherein the two or more nodes each depend only on an immediate predecessor node's output for its input parameters.

10. The computer program product according to claim 8, the program instructions further being executable by the computing device to cause the computing device to:

receive a request to perform a second editing operation on a second target node;

determine that the second target node is not included in the plurality of related grouped nodes; and in response to determining that the second target node is not included in the plurality of related grouped nodes, perform the second editing operation only on the second target node.

11. The computer program product according to claim 8, the program instructions further being executable by the computing device to cause the computing device to store information identifying the plurality of related grouped nodes in a persisted definition of each grouped node of the plurality of related grouped nodes.

12. The computer program product according to claim 8, the program instructions further being executable by the computing device to cause the computing device to store information about other nodes included in the plurality of related grouped nodes in a persisted definition of each grouped node of the plurality of related grouped nodes.

13. The computer program product according to claim 8, wherein the first editing operation is a delete operation.

14. The computer program product according to claim 8, wherein the first editing operation is a copy operation.

15. The computer program product according to claim 8, wherein the first editing operation is a move operation.

16. A system comprising:
   a hardware processor, a computer readable memory, and a computer readable storage medium associated with a computing device;
   program instructions to receive an integration flow document including information indicative of: (i) a plurality of nodes, with each node representing a processing step in an integration flow, (ii) a plurality of input parameters, and (iii) a plurality of input sources;
   program instructions to determine a plurality of mappings, with each mapping representing an association between an input parameter and an input source;
   program instructions to determine a plurality of grouped nodes of the plurality of nodes based upon the plurality of mappings;
   program instructions to receive a request to perform a first operation on a first target node of the plurality of nodes;
   program instructions to determine that the first target node is included in the plurality of grouped nodes; and
   program instructions to, in response to determining that the first target node is included in the plurality of grouped nodes, perform the first operation on each grouped node of the plurality of grouped nodes,
   wherein the program instructions are stored on the computer readable storage medium for execution by the hardware processor via the computer readable memory.

17. The system according to claim 16, further comprising:
   program instructions to receive a request to perform a second operation on a second target node;
   program instructions to determine that the second target node is not included in the plurality of grouped nodes; and
   program instructions to, in response to determining that the second target node is not included in the plurality of grouped nodes, perform the second operation only on the second target node.

18. The system according to claim 16, further comprising program instructions to store information identifying the plurality of grouped nodes in a persisted definition of each grouped node of the plurality of grouped nodes.

19. The system according to claim 16, further comprising program instructions to store information about other nodes included in the plurality of grouped nodes in a persisted definition of each grouped node of the plurality of grouped nodes.

20. The system of claim 16, wherein the plurality of grouped nodes comprises two or more nodes that each represent a processing step in a series of processing steps, and wherein the two or more nodes each depend only on an immediate predecessor node's output for its input parameters.

* * * * *